Jan. 2, 1962 J. R. WILLIAMSON ET AL 3,015,210
ATTITUDE CONTROL FOR HIGH ALTITUDE MISSILE
Filed Dec. 24, 1958 5 Sheets-Sheet 5

INVENTORS
JOHN R. WILLIAMSON
JOHN R. DOUSSARD.
BY
*Robert C. Smith*
ATTORNEY.

United States Patent Office 3,015,210
Patented Jan. 2, 1962

3,015,210
ATTITUDE CONTROL FOR HIGH ALTITUDE MISSILE
John R. Williamson and John R. Doussard, South Bend, Ind., assignors to The Bendix Corporation, a corporation of Delaware
Filed Dec. 24, 1958, Ser. No. 782,883
9 Claims. (Cl. 60—35.54)

This invention relates to control systems and more particularly to an attitude control system for a very high altitude missile capable of remaining in operation for a considerable period of time.

The requirements for an attitude control for a missile capable of being operated over several days are somewhat different from those having a comparatively short service life. Weight limitations are very severe and it is preferable that the system be so arranged that propellant is drawn from the supply source only as required. The system must otherwise be as light as possible consistent with proper accuracy and reliability of the components. Because of the velocities encountered, response times must be very short. It is, therefore, an object of the present invention to provide an attitude control system for a missile in which the consumption of propellant is minimized through the use of a control method requiring propellant consumption only upon demand.

It is another object of the present invention to provide an attitude control system which is very light in weight and which is very accurate and reliable.

It is another object of the present invention to provide an attitude control for a missile which has very fast response times compatible with the associated guidance equipment.

It is another object to provide an attitude control for a missile in which the propellant used is a monopropellant, the consumption of which may be controlled.

It is another object to provide an attitude control for a missile in which the propellant supply container need not be kept under pressure during storage.

It is a further object to provide an attitude control for a missile in which the propellant is kept out of contact with the various flow control devices to as great an extent as possible during storage.

Other objects and advantages will become apparent from the following specification taken in connection with the accompanying drawings in which:

FIGURE 6 is a cross sectional view of an alternate form of thrust controller in combination with a typical gas generator and regulator.

Figure 1:
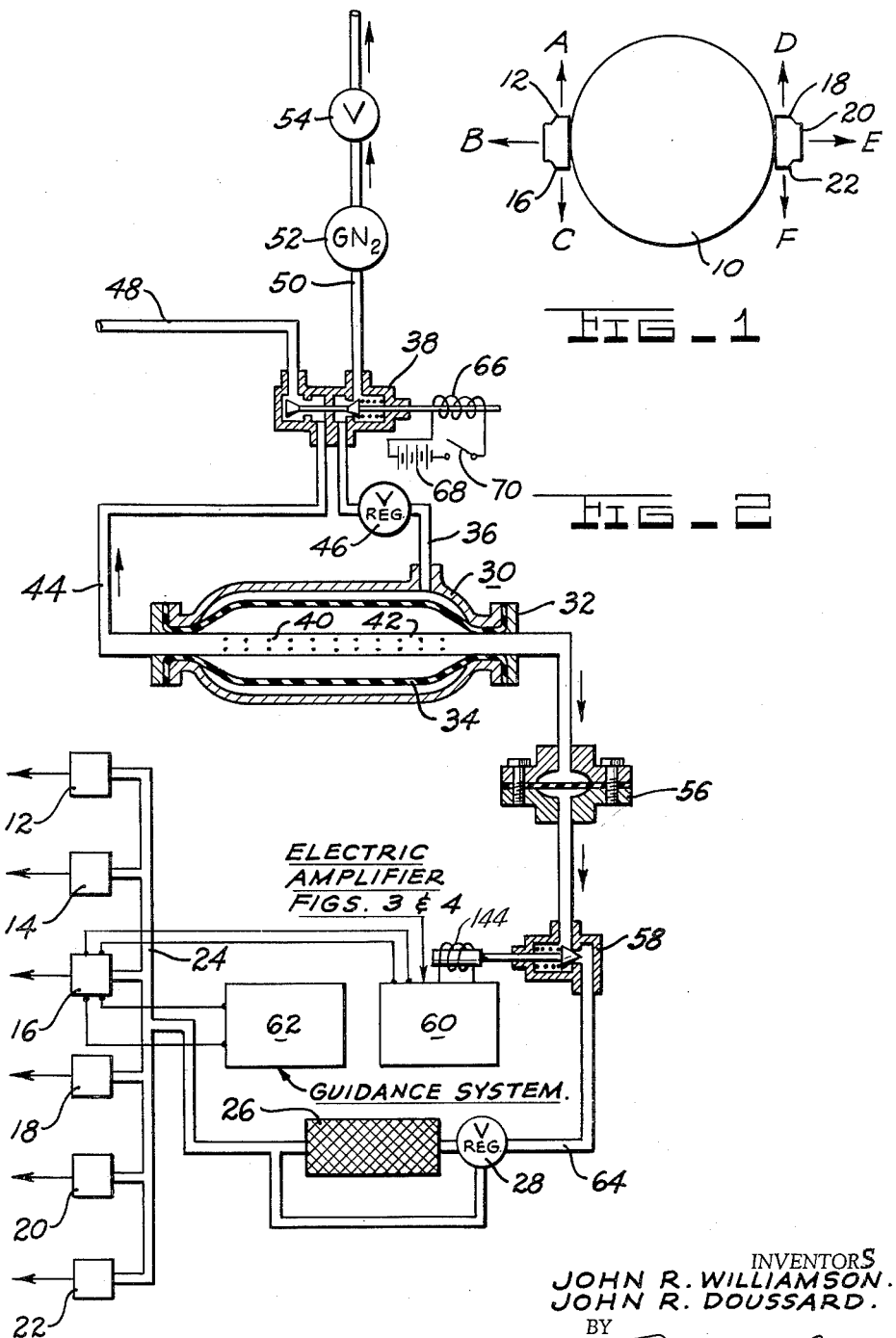
FIGURE 1 is an end view of a missile showing the six thrust controller and nozzle units used to control the attitude of the missile.

FIGURE 1 is an end view of missile showing six thrust controller nozzle units used to control the attitude of the missile. The missile 10 may be caused to change direction through actuation of one or more of the thrust control and nozzle units 12, 14, 16, 18, 20 and 22 which produce forces in directions A, B, C, D, E and F respectively. Thus the missile may be caused to roll through actuation of nozzles 12 and 22 which, when actuated, produce a flow out of said nozzles in the directions indicated by the arrows marked A and F. Similarly, a pitching motion may be corrected or imparted through the actuation of nozzles 16 and 22 which produce an ejection of propellant in the directions by the arrows marked C and F. Control for yaw is produced through actuation of nozzles 14 or 16 which cause an ejection of propellant in the direction of the arrows marked B and E, respectively. It will be recognized from the foregoing that essentially any desired roll, pitch or yaw component may be produced by the combination of thrust controllers shown on FIGURE 1.

Figure 2:
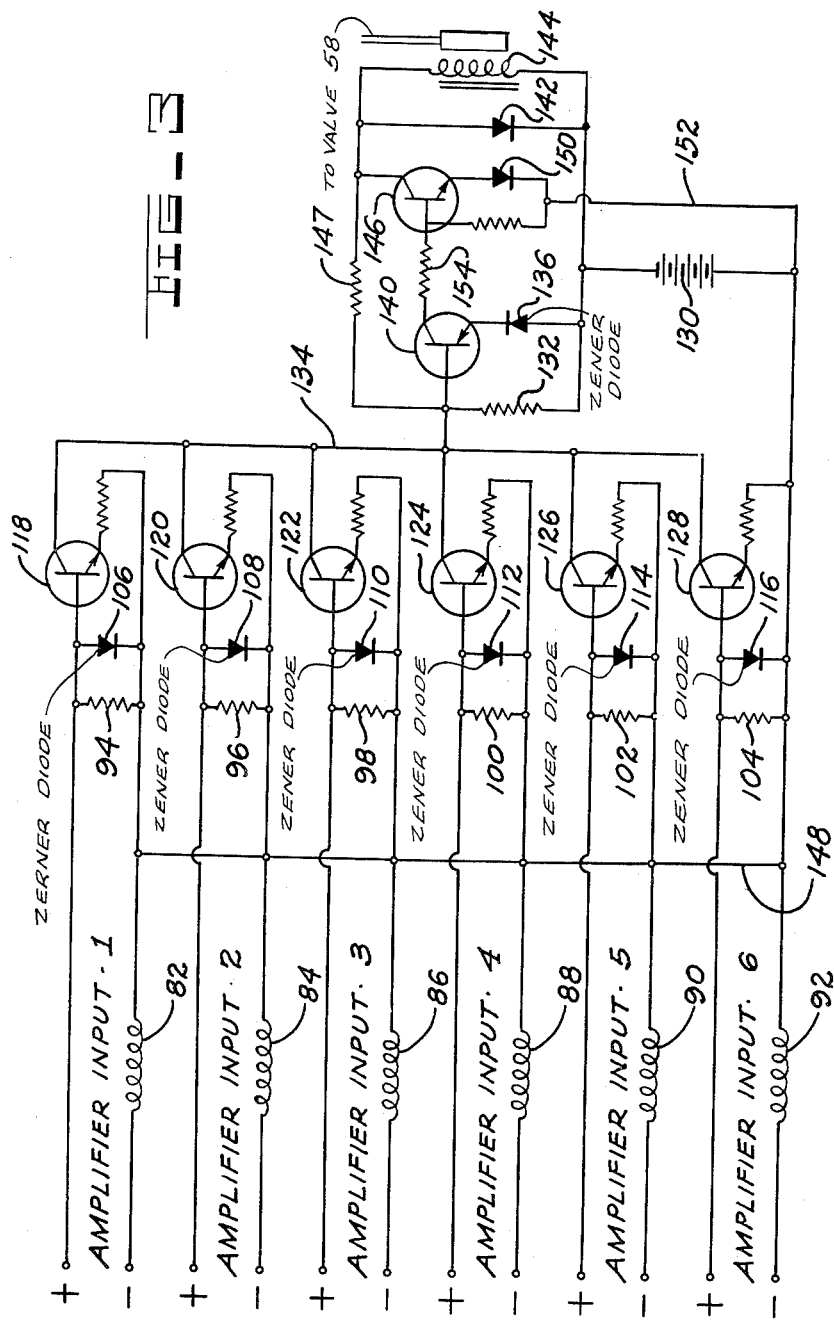
FIGURE 2 is a schematic view of an over-all attitude control system embodying our invention.

In FIGURE 2, the thrust controllers 12, 14, 16, 18, 20 and 22 are shown connected to a common manifold 24 which is, in turn, connected to the output of a gas generator unit 26 having a regulating valve 28 connected across it. Although the system shown herein is useful for a number of monopropellant fuels, it will be discussed in the present specification in connection with the use of hydrogen peroxide which is perhaps the most useful monopropellant fuel presently known for this particular type of application. The gas generator 26 used for effecting the decomposition of hydrogen peroxide may consist of a series of alternate layers of stainless steel and silver screen, the stainless steel screen being of a corrosion resistant type which is essentially impervious to the corrosive action of the hydrogen peroxide and which will tend to hold the silver screen, which is the effective catalyst, in position. The output of the gas generator or catalyst bed 26 is a combination of oxygen and steam at high temperature and this output is controlled by means of the regulator 28 shown and described in greater detail in FIGURES 5 and 6. The hydrogen peroxide storage tank is shown at numeral 30. It contains an external case 32 and an internal resilient bladder 34 within which is contained liquid hydrogen peroxide. The chamber between casing 32 and bladder 34 is in communication with a conduit 36 which is connected to a regulating valve 46 and a two-way solenoid valve assembly 38. The hydrogen peroxide in the interior of bellows member 34 is in communication through a series of ports 40 in a conduit 42 which is positioned through the center of the tank 30 and through a conduit 44 which communicates with the solenoid valve structure 38 which is, in turn, in communication with a conduit 48 communicating with the atmosphere. The solenoid valve structure 38 is also in communication through a conduit 50 with a tank 52 containing nitrogen under high pressure. This tank is also connected to a relief valve 54 which is responsive to excessive pressures acting within tank 52 to communicate the interior of said tank with the atmosphere, thereby protecting the tank 52 from damage resulting from excessive internal pressures. The perforated conduit 42 which passes through the center of tank member 30 is also in communication with a frangible disk assembly 56 and with a solenoid valve assembly 58 which is controlled by means of an electrical amplifier to be described in greater detail in connection with FIGURES 3 and 4. The electrical amplifier 60 is supplied with a plurality of guidance signals from a guidance system 62 connected to the amplifier 60. Although the details of the guidance system 62 form no part of the present invention, it may be considered to consist of an electrical computing network which receives electrical signals either from a ground source or from a source carried on the missile and converts these electrical signals to a form useful in the electrical amplifier 60. The solenoid valve structure 58 controlled by the electrical amplifier 60 serves to control the communication of liquid hydrogen peroxide through a conduit 64 with the gas generator 26.

Figure 5:
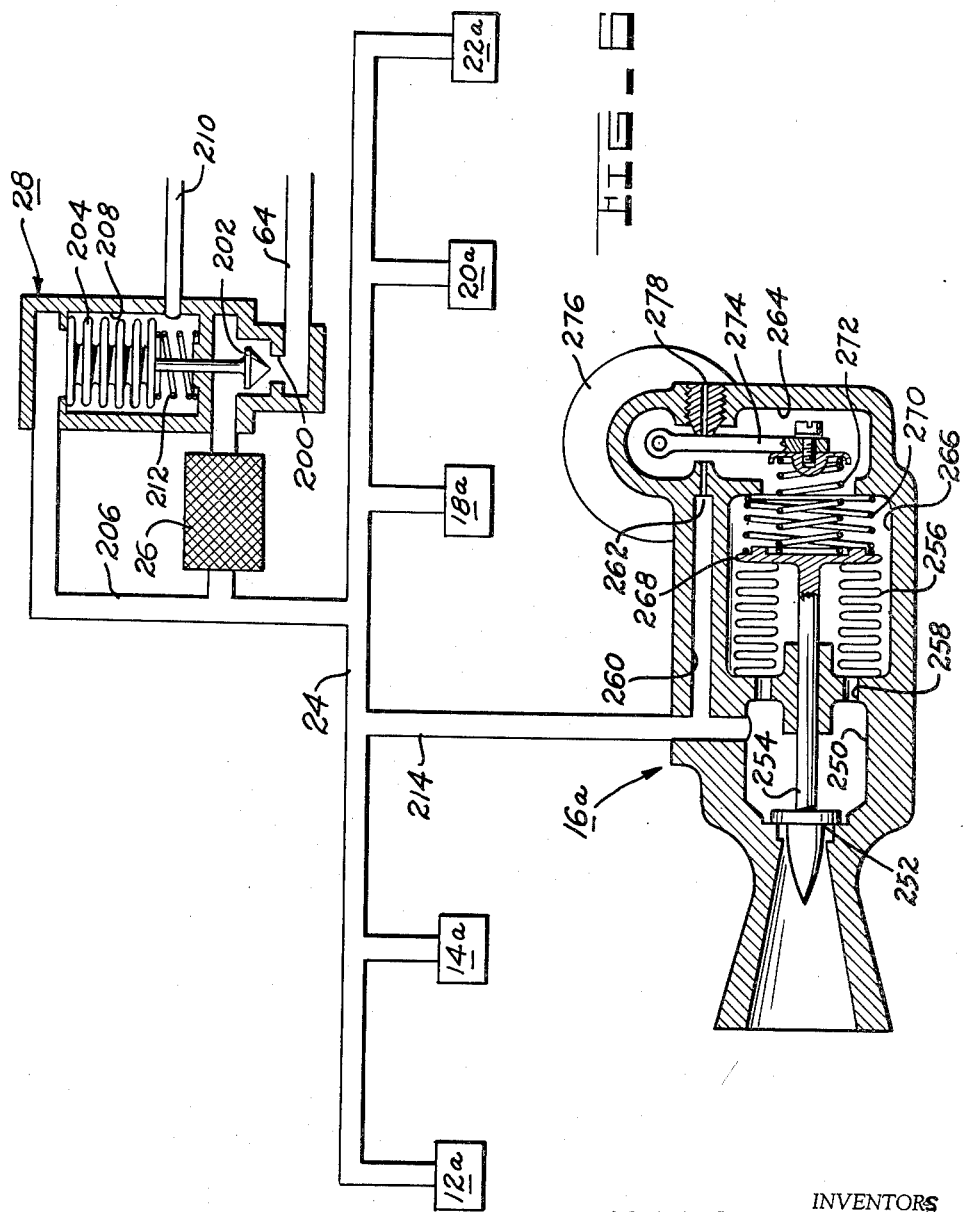
FIGURE 5 is a cross sectional view showing one form of thrust controller unit in combination with a typical gas generator and regulator.

The solenoid 38 is actuated by means of a winding 66 supplied from a source of electrical energy shown as a battery 68 and which is effective to energize the winding 66 upon the closing of a switch 70. Previous to closing the switch 70 the valve will be in the position shown. Under these conditions the liquid hydrogen peroxide in the interior of the bladder member 34 is in communication through ports 40 with the interior of conduit 42 and, through conduit 44, the solenoid valve structure 38 and conduit 48 with the atmosphere. The hydrogen peroxide in storage is therefore not pressurized but is in direct communication with the atmosphere. The nitrogen tank 52 communicates through conduit 50 with the solenoid valve member 38 which is held closed, thereby preventing a flow of nitrogen through conduit 36, regulator valve 46 and into the interior of casing 32. When switch 70 is closed, the solenoid valve member is moved toward the right, thus closing off communication between the hydrogen peroxide source in the interior of bladder 34 and the atmosphere and opening communication between the nitrogen tank 52 and the chamber in the interior of casing 32. This high pressure nitrogen then causes the bladder 34 to be compressed toward the perforated conduit 42. This immediately increases the pressure in the line immediately upstream from the frangible disk assembly 56 and this member is ruptured thereby permitting flow to the solenoid valve assembly 58. If the solenoid valve member 58 is open, hydrogen peroxide will flow to the gas generator 26 where it is decomposed into a gase at a rate controlled by the regulator 28. This gas then flows to the manifold 24 where it is distributed to whichever of the thrust nozzles happens to be open. The thrust nozzle members as shown in FIGURES 5 and 6 are each controlled by the amplifier 60 such that no peroxide will be permitted past solenoid 58 unless one of said nozzles is open.

Figure 3:
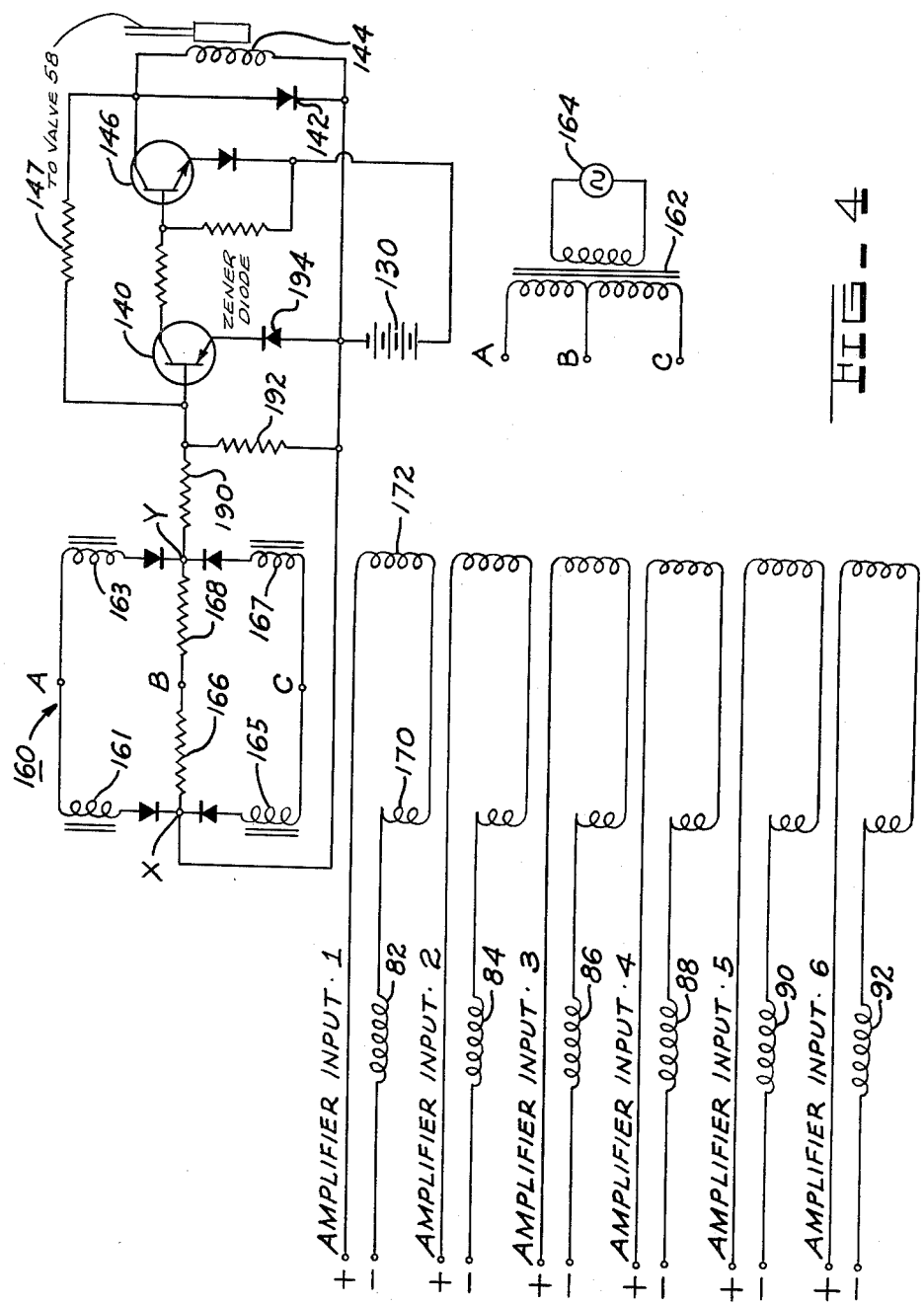
FIGURE 3 is a schematic drawing of an electrical switching amplifier for controlling flow through a particular nozzle unit or combination of units.

One modification of the electrical amplifier 60 of FIGURE 2 is shown in detail schematically in FIGURE 3. This amplifier shows six pairs of input terminals, one for each of the nozzles 12, 14, 16, 18, 20 and 22. Each of these input signals is supplied from the guidance system 62. The amplifier inputs sections 1–6 each include a control winding for one of the torque motors 82, 84, 86, 88, 90 and 92. Connected across these input terminals for the respective amplifiers are thermistors 94, 96, 98, 100, 102 and 104 and a plurality of Zener diodes 106, 108, 110, 112, 114 and 116. Also connected in each of said amplifier input sections 1–6 is a transistor, the transistor 118 being connected in amplifier input section 1 and transistors 120, 122, 124, 126 and 128 being connected in the amplifier input sections 2, 3, 4, 5 and 6 respectively. A direct current power supply for this amplifier system is shown as a battery at numeral 130 which is connected through a resistor 132 with a line 134 connected to the collector circuits of each of said transistors. Battery 130 is also connected through a diode 136 with the emitter circuit of a transistor 140 and through a diode 142 and a solenoid winding 144 (forming part of solenoid assembly 58, see FIGURE 2) to the collector circuit of a transistor 146. A resistor 147 provides a connection between the collector circuit of transistor 146 and the base circuit of transistor 140. Each of the amplifier inputs 1–6 is connected to the opposite side of the battery 130 through a wire 148 and the emitter circuit of transistor 146 is connected through a diode 150 with the same side of battery 130 through wire 152.

The operation of this system may be best understood through consideration of the effect of placing a signal on the terminals of amplifier input 1. Inasmuch as each of amplifier input sections 1–6 work in exactly the same manner, an output from any of said amplifiers having exactly the same effect on the switching circuit consisting of transistors 140 and 146 which ultimately acts to energize solenoid winding 144. Let us assume at the outset that the guidance system 62 provides a very low level spurious signal to amplifier 1 which signal is a result of an undesired generation of a voltage somewhere in the guidance system. This low level signal will be effectively dissipated in resistor 94 and will not be of sufficient magnitude to energize torque motor winding 82 sufficiently to actuate the torque motor forming part of the nozzle assembly 12 (FIGURE 2). Should a larger signal be received from the guidance system constituting a request for a change in attitude, this signal will energize torque motor windings 82 and the torque motor will act to cause flow through the nozzle 12. At the same time, this current causes conduction in transistor 118 and an appreciable current flow occurs from the collector circuit of this transistor to the base electrode of transistor 140. This results in a voltage drop across resistor 132 which is sufficient to cause conduction across the Zener diode 136 and transistor 140 conducts thereby causing current flow through a resistor 154 to the base of transistor 146. This causes transistor 146 to conduct and current is then caused to flow through the solenoid winding 144 and also back through the feedback resistor 147 to the base circuit of the transistor 140. This last path of flow constitutes a regenerative feedback path and tends to hold the transistors 140 and 146 in a conducting condition. When current flows through the solenoid winding 144 there is an induced back E.M.F. generated which may be sufficient to damage the transistor 146. In order to protect this transistor from such an event, the diode 142 is connected in parallel with the winding 144 and this effectively blocks any excess current flow which might otherwise tend to damage transistor 146.

It is known that the transistors have a tendency to vary their threshold voltage with changes in ambient temperature and this result in the present application would be undesirable because the level of conduction of the transistor might not be consistent for a given signal from the guidance system. The thermistor 94, in addition to establishing a dead band in the switching amplifier that is greater than the permissible guidance system drift seen by the torque motor windings also effectively compensates for the change in the threshold of the input transistor due to ambient temperature changes. Once the torque motor winding 82 is energized there will be a tendency for the torque motor winding 82 to draw a quantity of current which would overdrive the transistor 118. Once the transistor is turned on, however, the torque motor current is shunted through the diode 106 and the transistor current is thereby kept within an acceptable limit. In spite of the temperature compensation of the various transistors by means of the associated thermistors, there may be small temperature effects in each of the amplifier input sections 1–6 which, when added together at the base of transistor 140, might tend to cause said transistor to conduct thereby energizing the solenoid winding 144. This would be very undesirable, inasmuch as it would occur at a time when no one input signal was sufficiently large to call for a flow from one of the nozzle units. The Zener diode 136 effectively sets up a dead band for the switching circuit so that a finite substantial voltage drop across the resistor 132 and the Zener diode 136 is required before the transistor 140 will conduct. From the foregoing it will be appreciated that whether the guidance system 62 supplies an input signal only to one input such as input 1, as described, or to a plurality of inputs, as in the case when it is desired to actuate nozzles 12 and 22 to effect a rolling motion of the missile 10, the appropriate torque motor winding or windings are energized thereby opening the appropriate nozzle or nozzles and the solenoid winding 144 is energized opening valve 58 to permit hydrogen peroxide to reach the gas generator unit 26.

Figure 4:
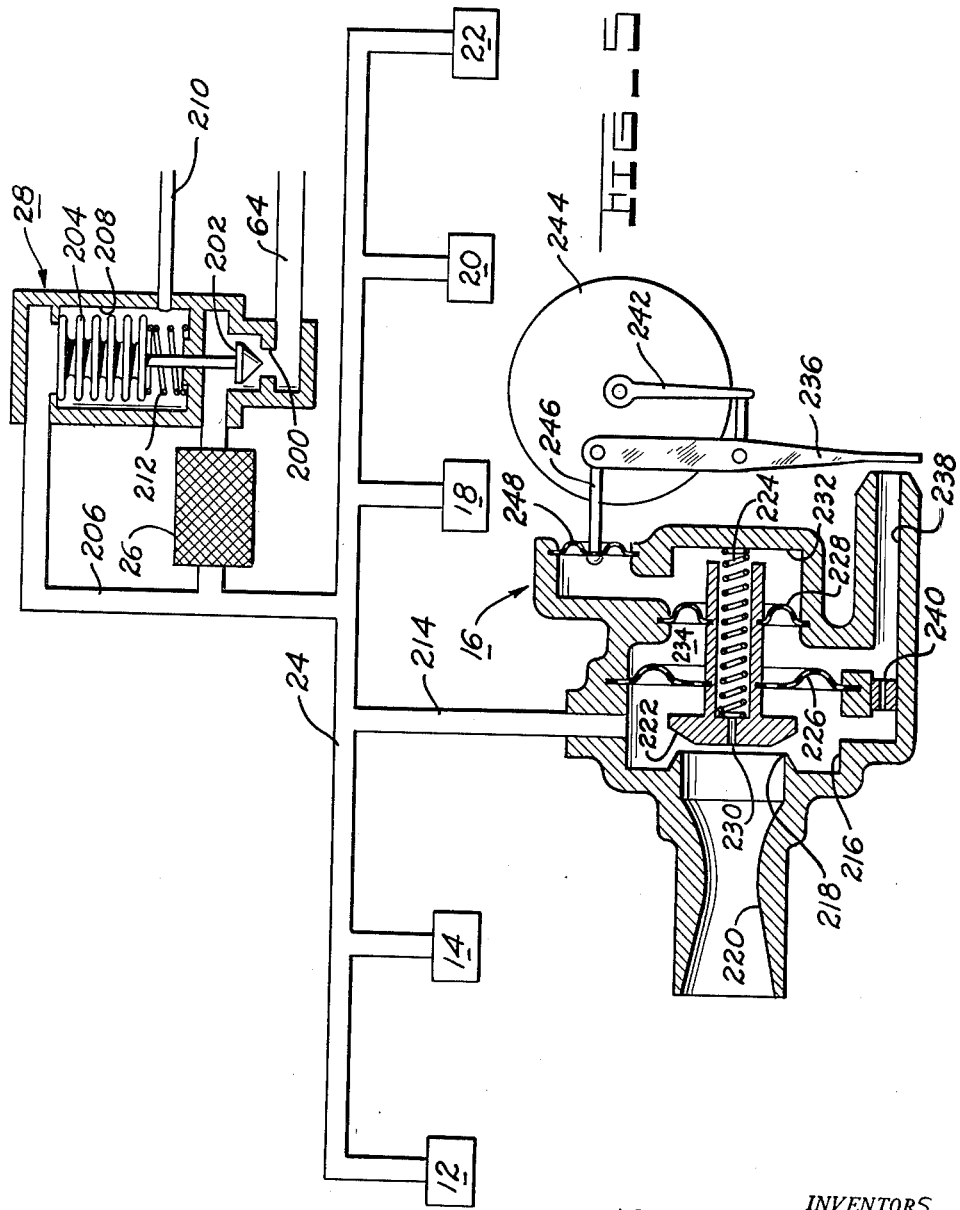
FIGURE 4 is a schematic drawing of a modified form of electrical switching amplifier.

In the amplifier modification shown in FIGURE 4, a full-wave magnetic amplifier is used as the preamplifier to a transistor switching circuit essentially identical to that of FIGURE 3. The power section of the magnetic amplifier is shown generally at numeral 160 and consists of four power windings 161, 163, 165 and 167 connected in an inverse parallel, full-wave configuration. The alternating current power supply consists of a transformer 162 supplied from an alternating current source 164 and having secondary windings which are connected to the magnetic amplifier power section 160 at terminals A, B and C, as shown. Each branch of the power section 160 contains, in addition to its respective power winding, a rectifier so that each individual branch responds to a particular half cycle of the A.C. power supplied to the power section 160. Consider a half cycle of operation when the end of the secondary winding of transformer 62 marked A is positive. Current will then flow from terminal A through power windings 161 and 163 and their respective rectifiers, through a pair of load resistors 166 and 168 back to the center tap B of the transformer 162. No current flows in the power windings 165 and 167 because of the action of the rectifiers in their respective circuits. During the next half cycle the current flow proceeds through the power windings 165 and 167 and through the load resistors 166 and 168 to the center tap B of the transformer. Inasmuch as the voltages across the load resistors 166 and 168 are equal and opposite, in the absence of a signal on the control windings, there is no output from the power section 160, as measured between terminals X and Y.

The usual manner of manufacturing these magnetic amplifiers is to place the two power windings and their respective cores which are operating in the same half cycle in one stack and then wind a single control winding around each of these power windings. Thus the power windings 161 and 163 and their respective cores are placed on the same stack and around this stack is wound one of the control windings, e.g. control winding 170. At the same time, the power windings 165 and 167 are placed on their respective cores and these cores are stacked together and the control winding 172 is wrapped around this second stack. With the amplifier assembled as described, an input appearing on control windings 170 and 172 will bring about the following results in the power section 160: The signal on winding 170 will have the effect of driving the core of winding 161 further into saturation and the core of winding 163 out of saturation and this causes a reduction in the average voltage drop across the winding 161 and an increase in the average voltage drop across the winding 163. Inasmuch as the total average voltage drop from point A to point B must remain the same, the average voltage drop across resistor 166 must necessarily exceed the average voltage drop across 168 and there will be an output from the amplifier reflecting this difference. During this same half cycle, the control winding 172 will be carrying the same signal as control winding 170 and during this cycle serves to reset the cores of windings 165 and 167. In the next half cycle, the power windings 165 and 167 will be conducting and there will be an effect on the output produced by the signal on control winding 172 but none by the signal on winding 170. Signals applied to any of the amplifier inputs 1–6 will produce exactly the same result as that described. This will also be true if input signals are supplied to a combination of the inputs as set forth above. The torque motor winding shown in connection with amplifier input 1 has been numbered 82 since it is effectively the same torque motor winding as that shown in FIGURE 3. Similarly the remaining torque motor windings are numbered the same as those of FIGURE 3. It will be appreciated that the power section of the magnetic amplifier 160 which has been designed to provide a very closely balanced output for each half cycle will be vulnerable to any stray or spurious signals appearing on any of the control windings. In view of the fact that several sets of control windings are used, it is also possible that the spurious signals may add together to cause a rather significant voltage output from the power section 160. In the device of FIGURE 3, this problem was somewhat minimized because there was an inherent dead band built into each of the input sections. In the case of the magnetic amplifier version of FIGURE 4, however, the dead band associated with the preamplifier section is of much lower magnitude so the transistor switching amplifier must be designed to require a higher threshold voltage level before conduction takes place. The output of the magnetic amplifier power section 160 is a voltage measurable between the points marked X and Y and this same voltage is effective across a resistor 190 and a resistor 192. The voltage drop across resistor 192 appears across a Zener diode 194 and this diode is chosen to have an inverse breakdown voltage of sufficient value to exceed the output of the magnetic amplifier which might arise as a result of any reasonable combination of spurious control signals appearing on the control windings. Should a voltage be supplied across resistor 192 which is sufficient to cause conduction across diode 194, the transistor 140 will conduct thus supplying a current flow to the base of transistor 146 causing a conduction of this transistor. Conduction of transistor 146 causes a current flow through the solenoid winding 144 as described in connection with the device of FIGURE 3 and also causes a regenerative signal to be fed back through resistor 147 to the input of transistor 140. This regenerative signal tends to keep the switching amplifier turned on even though some voltage fluctuations may occur at the input to the switching amplifier. As in the amplifier of FIGURE 3, the diode 142 limits the current drain from the transistor 146 which might be caused by voltage surges from the solenoid 144. A direct current power source shown as a battery 130 constitutes a power supply for the transistors 140 and 146.

FIGURE 5 shows the connections between the gas generator unit 26 and the thrust control and nozzle units 12, 14, 16, 18, 20 and 22 with the regulator for the gas generator 28 and one of the nozzle units shown in section. In this device liquid hydrogen peroxide is supplied from the source (FIGURE 2) through the conduit 64 to an orifice 200 controlled by a valve member 202. Flow passing valve member 202 enters the gas generator 26 and the liquid hydrogen peroxide is then decomposed into steam and excess oxygen. This fluid is then supplied to the manifold 24 where it may be distributed to one or more of the nozzle units. The pressure generated by the gas generating unit 26 is sensed by means of a bellows 204 connected with the downstream side of the gas generator 26 by means of a conduit 206. The bellows 204 is located in a chamber 208 which is vented to the atmosphere by means of a conduit 210 and the bellows therefore responds to the pressure differential between the discharge side of the generator 26 and the pressure of the atmosphere plus the force of a small spring 212. In the absence of an output from the gas generator 26, this regulating valve 202 will be held open under the action of spring 212. It will continue to be open and permit liquid hydrogen peroxide to flow to the generating unit 26 until the gas pressure sensed downstream from the generating unit 26 becomes sufficiently large that this pressure, as sensed in the interior of bellows 204, is sufficient to overcome the force of spring 212 and close valve member 202. From the foregoing it will be seen that the supply of liquid hydrogen peroxide to the gas generator 26 is controlled in accordance with the demand as established by the effective pressure level downstream of the generating unit 26 and hence, flow from the various nozzle units.

Inasmuch as all of the nozzle and thrust control units are identical, only one has been shown in FIGURE 5 which will now be described in detail. Flow to manifold 24 is supplied to the nozzle unit 16 through a conduit 214 where it enters a chamber 216, flows across an orifice 218 and out of a nozzle 220. Flow through orifice 218 and hence through nozzle 220 is controlled by means of a valve member 222 biased in a closing direction by means of a spring 224 and carried by a pair of diaphragms 226 and 228. A small passage 230 in the face of valve member 222 provides communication with the downstream side of said valve and a chamber 232 on the right hand side of diaphragm 228. A chamber 234 is formed between the diaphragms 226 and 228 and the effective pressure level in this chamber is controlled by means of an auxiliary flapper member 236 which controls the flow out of a conduit 238 forming part of the chamber 234. A bleed 240 connects chambers 216 and 234. The flapper member 236 is controlled by a torque motor flapper 242 forming part of a torque motor 244, which is moved in response to energization of one of the torque motor windings such as winding 86 of FIGURES 3 and 4. The upper end of auxiliary flapper member 236 is connected with a link 246 controlled by means of a small diaphragm 248 responsive to the pressure in chamber 232.

Operation of this unit is as follows: In the absence of a significant pressure on the downstream side of gas generating unit 26, there will be no appreciable pressure acting on the left side of diaphragm 226 and the valve member 222 will be held closed on the action of the spring 224. During the time when a high pressure exists in manifold 24, there will be a substantial pressure in chamber 216 acting on the left side of diaphragm 226 and, so long as flapper valve 236 remains on its seat blocking conduit 238, flow through bleed 240 will be sufficient to maintain the pressure in chamber 234 substantially equal to that in chamber 216, thus the pressure on each side of diaphragm 226 is approximately the same. The effective area of the metering valve 222, when closed, is the same as the effective area of the diaphragm 228 and the forces produced by these pressures are, therefore, also equal. The valve member 222 will therefore be held closed by spring 224 because the pressures acting within the respective chambers all effectively cancel. Should a signal be supplied to the torque motor 244 which moves flapper member 236 from its seat against the conduit 238, there will be a substantial reduction in the pressure level in chamber 234. In this case, the difference between the pressure in chamber 216 and the pressure in chamber 234 acts over a net area equal to the difference between the effective areas of the two diaphragms and the resulting force moves the main valve open against the spring 224. This permits flow through the orifice 218 and the nozzle 220 and also permits communication through port 230 between the downstream side of valve 222 and the chamber 232. From the foregoing, it will be apparent that the pressures acting on the diaphragms 226 and 228 are the same and the net force effective to open the valve 222 is only that resulting from the unequal areas of the said diaphragms. Flow through port 230 to the interior of chamber 232 causes a pressure to act on the inside of diaphragm 228, translating link 246 and effecting a rotation of the flapper member 236 around its center pivot point and tending to move the flapper 236 in a closing direction. The valve 222 ultimately reaches a position where the pressure downstream of said valve and in chamber 216 is that required to balance the pressure feedback on diaphragm 248 and the torque motor output acting through the flapper valve 236. Thus the thrust from the type of unit shown in FIGURE 5 is varied by means of controlling the effective pressure in chamber 234.

FIGURE 6 shows the identical fluid connections, gas generator and regulator system shown in FIGURE 5 but shows a nozzle and thrust controller unit using the principle of varying the nozzle throat area to vary thrust. As in the case of FIGURE 5, liquid hydrogen peroxide flows through a conduit 64 across an orifice 200 controlled by a valve member 202 to the gas generator 26. The gaseous products of decomposition of the liquid hydrogen peroxide appear as a high temperature compressible fluid composed of stream and excess oxygen and this gas is supplied to the manifold 24 and to the various nozzle and thrust controller units. The unit 16a is connected with the manifold 24 by means of a conduit 214 and contains a chamber 250 in communication with conduit 214 containing a valve member 252 carried on a shaft 254. The fluid pressure in chamber 250 is in communication with the interior of a bellows 256 through a plurality of ports 258 and the opposite side of said bellows is in communication through a conduit 260, a restriction 262, a chamber 264 and a chamber 266 with the inlet conduit 214. Attached to the end of shaft 254 is a member 268 which seals the end of bellows 256 and also provides a retainer for a first spring 270 which abuts against the housing 16a and a second spring 272, the other end of which abuts against a retainer formed on an extension of the flapper 274 of torque motor 276. When torque motor 276 is not energized, the flapper 274 is held tightly against an orifice 278 through the action of spring 272.

When the system in the quiescent state and the pressure level in manifold 24 is low, the valve member 252 is held against its seat through the action of the spring 270. When the generator 26 is producing gas at substantial pressure, this gas is supplied through manifold 24 and conduit 214 to the chamber 250 and also through ports 258 to the interior of bellows 256. This gas is also supplied through the conduit 260, the restriction 262, and through the chambers 264 and 266 to the outside of bellows member 256. In the absence of a signal on the torque motor 276, the pressures acting on the bellows 256 will be essentially the same and the valve member 252 will be maintained in a closed position. When the torque motor 276 is energized, the flapper valve 274 is rotated clockwise thereby opening the bleed 278 and permitting a reduction in the pressure level acting on the outside of bellows 256. This permits the pressure acting on the interior of the bellows 256 to move member 268 toward the right against the action of spring 270 thus moving valve member 252 off its seat and permitting flow through the nozzle. As valve member 252 moves, the shaft 254 and the retainer member 268 are moved toward the right. This movement causes a compression of spring 272 which results in a position feedback to the flapper member 274. The thrust output of the unit 16a varies with the effective throat area of the nozzle and this, in turn, varies with the axial position of the valve member 252. The valve position finally reached is that position which produces a feedback force from spring 172 which balances the torque motor output.

During the time that the missile and its associated propellant and attitude control systems are in storage, the liquid hydrogen peroxide in tank 30 will be vented to the atmosphere through the solenoid valve structure 38 and the conduit 48 and the flow of nitrogen from tank 52 through the solenoid valve structure 38 is effectively blocked. Because of the frangible disk assembly 56 there is no flow of liquid hydrogen peroxide, which is very corrosive, to the solenoid valve structure 58, the generator 26 and regulator 28, nor to any of the thrust control and nozzle devices. At the time when it is first desired to actuate the system, the switch 70 is closed thus causing winding 66 to be energized and moving the solenoid valve members to the position opposite to that shown, thus interrupting communication between the interior of the bladder member 34 and the atmosphere and providing communication between the nitrogen tank 52 and the interior of the casing 32. As the nitrogen, which is under high pressure, begins to flow to the interior of casing 32, the bladder 34 is compressed in the direction of the perforated conduit 40 and the liquid hydrogen peroxide is placed under sufficient pressure to rupture the frangible disk in the assembly 56 thereby providing communication of liquid hydrogen peroxide to the solenoid valve assembly 58. Suppose that there is, at this instant, a signal from the guidance system 62 requesting a flow in the direction A from nozzle 12 (FIGURE 1).

An input signal will then be supplied to amplifier input 1, energizing torque motor winding 82 and causing either of flapper members 236 or 274 to be moved away from their respective orifices thereby causing the valve members 222 or 252 to be moved in an opening direction. At the same time, this signal causes flow across the diode 106 and conduction of the transistor 118 which, in turn, results in energizing of the regenerative transistor amplifier circuit including transistors 140 and 146 which act to energize solenoid winding 144. This provides a path through the solenoid structure 58 and through conduit 64 to the gas generator 26 where the liquid hydrogen peroxide is converted into a gas and supplied to the manifold 24. In this case, the nozzle unit 12 will be the only unit in which the valve members 222 or 252 are open and flow will be supplied to this unit.

Should the amplifier be of the form shown in FIGURE 4 rather than that of FIGURE 3, the input to the amplifier will result in energizing the control windings 170 or 172 thereby causing a voltage output from the power section 160 which is developed across resistors 190 and 192 sufficient to cause conduction across the diode 194 and energizing transistor 140. This, in turn, causes the transistor 146 to be energized and current is again supplied to the solenoid winding 144 to open the solenoid valve 58. Should the signal from the guidance control 62 call for actuation of more than one nozzle unit, operation will be essentially the same. In the case of the amplifier of FIGURE 3, actuation of inputs 1 and 4 to cause a change in pitch of the missile would result in energizing both of transistors 118 and 124 and the torque motor windings 82 and 88. The transistor 140 in the transistor switching circuit will conduct irrespective of the number of preamplifier transistors which are conducting and the solenoid winding 144 is accordingly energized. The same is true with the amplifier of FIGURE 4, where a signal supplied to amplifier inputs 1 and 4 will result in energizing two sets of control windings, but the over-all effect so far as the transistor switching amplifier is concerned is the same. It also results in actuating two separate nozzle assemblies 12 and 18 and flow will be supplied from the gas generator 26 and the manifold 24 to these two nozzle assemblies simultaneously.

Although only a limited number of embodiments have been shown and described herein, modifications may be made to suit the requirements of particular applications.

We claim:

1. An attitude control for an aircraft comprising a plurality of nozzles positioned to produce thrust forces for varying the attitude of said aircraft, a source of liquid propellant, means for converting said propellant into a gas having a high kinetic energy level, conduit means for distributing said gas to said nozzles, an electro-responsive device associated with each of said nozzles for controlling flow from the respective nozzles, an electrically actuated valve for controlling the flow of liquid propellant from said source to said converting means, an electrical amplification device including a switching amplifier operatively connected to said valve and means for receiving a plurality of electric input signals and plural supply means for selectively supplying a plurality of output signals so that each output signal selectively energizes one of said electro-responsive devices so that gas flows from its associated nozzle and also energizes said switching amplifier to increase liquid flow past said valve.

2. An attitude control as set forth in claim 1 wherein said propellant source includes a tank and a flexible bladder in said tank, a supply of liquid monopropellant in said tank, a first conduit communicating the interior of said bladder with the atmosphere, a source of inert gas under pressure and a second conduit communicating said inert gas with the interior of said tank outside of said bladder, second valve means effective when in a first position to permit flow through said first conduit and block flow through said second conduit and when in a second position to block flow through said first conduit and permit flow through said second conduit, a third conduit communicating the interior of said bladder with said electrically actuated valve.

3. An attitude control as set forth in claim 1 wherein said electrical amplification device includes a preamplifier section having a transistor amplifier for each of said input signals, and said switching amplifier is connected to all of said transistor amplifiers and is energized upon the conduction of any one of said transistor amplifiers.

4. An attitude control as set forth in claim 1 wherein said electrical amplification device includes preamplifier means having input connections to each of said input signals and said switching amplifier is energized by said preamplifier when an input signal is supplied to any of said input connections.

5. An attitude control as set forth in claim 1 wherein said electrical amplification device includes a magnetic preamplifier section wherein the alternating current power windings are arranged in an inverse-parallel, full wave configuration and said input means includes a pair of direct current control windings inductively related to said power winding for receiving each of said input signals.

6. An attitude control as set forth in claim 5 wherein said switching amplifier includes a plurality of transistor amplifier stages, a regenerative feedback loop connected around said device, and a Zener diode connected in the input to the first stage of said amplifier to establish a substantial threshold voltage level before said first stage will conduct.

7. An attitude control as set forth in claim 1 wherein said electro-responsive device comprises a housing, a valve member in said housing controlling flow to said nozzle, a spring biasing said valve member in a closing direction, a first diaphragm fastened to said housing and to said valve member to form a first chamber in said housing, a second diaphragm having a smaller effective area than said first diaphragm fastened to said housing and said valve member to form a second chamber in said housing and cooperating with said first diaphragm to form a third chamber in said housing, a bleed connected between said first and third chambers, a port communicating said third chamber with a low pressure source, a flapper valve for controlling flow through said port, a torque motor controlling said flapper valve, a conduit providing communication between the downstream side of said valve member and said second chamber, and means responsive to the pressure in said second chamber for providing a feedback signal to said flapper valve.

8. An attitude control as set forth in claim 1 wherein said converting means comprises a catalyst bed, a valve for controlling the admission of propellant to said catalyst bed, and fluid pressure responsive means connected to the outlet side of said catalyst bed for controlling the position of said valve.

9. An attitude control as set forth in claim 1 wherein said electro-responsive device comprises a housing, a valve in said housing controlling flow to said nozzle, a first chamber and a second chamber in said housing, a movable wall device connected to said valve and responsive to the pressure differential between said chambers, means communicating said first chamber with said conduit means, means including a restriction for communicating said conduit means with the opposite side of said movable wall device, a bleed communicating said second chamber with a lower pressure source, a torque motor and a flapper valve attached to said torque motor for controlling flow through said bleed, and resilient means responsive to movement of said movable wall means for providing a feedback force to said flapper member.

(References on following page)

References Cited in the file of this patent

UNITED STATES PATENTS

| | | |
|---|---|---|
| 789,962 | Callahan | May 16, 1905 |
| 1,532,930 | O'Neill | Apr. 7, 1925 |
| 2,308,261 | Bartlett et al. | Jan. 12, 1943 |
| 2,421,810 | Simpson | June 10, 1947 |
| 2,605,609 | Bush | Aug. 5, 1952 |
| 2,631,426 | Jewett | Mar. 17, 1953 |
| 2,682,614 | Lenehan | June 29, 1954 |
| 2,714,874 | Hart | Aug. 9, 1955 |
| 2,844,938 | Longwell | July 29, 1958 |
| 2,859,355 | Heiberger | Nov. 4, 1958 |
| 2,880,582 | Turansky et al. | Apr. 7, 1959 |
| 2,974,594 | Boehm | Mar. 14, 1961 |

FOREIGN PATENTS

| | | |
|---|---|---|
| 479,717 | Germany | July 22, 1929 |
| 610,143 | Great Britain | Oct. 12, 1948 |

UNITED STATES PATENT OFFICE
CERTIFICATE OF CORRECTION

Patent No. 3,015,210 January 2, 1962

John R. Williamson et al.

It is hereby certified that error appears in the above numbered patent requiring correction and that the said Letters Patent should read as corrected below.

Column 3, line 27, for "gase" read -- gas --; column 6, line 40, for "lquid" read -- liquid --; column 7, line 75, for "stream" read -- steam --.

Signed and sealed this 9th day of October 1962.

(SEAL)
Attest:

ERNEST W. SWIDER
Attesting Officer

DAVID L. LADD
Commissioner of Patents